United States Patent
Cheng et al.

(10) Patent No.: US 10,753,774 B2
(45) Date of Patent: Aug. 25, 2020

(54) CRYOGENIC FIBER OPTIC SENSOR DEVICE

(71) Applicant: Nederlandse Organisatie voor toegepast—natuurwetenschappelijk onderzoek TNO, s-Gravenhage (NL)

(72) Inventors: Lun Kai Cheng, 's-Gravenhage (NL); Hendrik Rendering, 's-Gravenhage (NL); Oana Elena Van Der Togt, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/778,767

(22) PCT Filed: Nov. 25, 2016

(86) PCT No.: PCT/NL2016/050832
§ 371 (c)(1),
(2) Date: May 24, 2018

(87) PCT Pub. No.: WO2017/091073
PCT Pub. Date: Jun. 1, 2017

(65) Prior Publication Data
US 2018/0356262 A1  Dec. 13, 2018

(30) Foreign Application Priority Data
Nov. 25, 2015  (EP) .................................. 15196360

(51) Int. Cl.
*G02B 6/02* (2006.01)
*G01D 5/353* (2006.01)
(Continued)

(52) U.S. Cl.
CPC ..... *G01D 5/35377* (2013.01); *G01D 5/35312* (2013.01); *G01K 11/3206* (2013.01); *G01K 13/006* (2013.01); *G02B 6/02076* (2013.01)

(58) Field of Classification Search
CPC ........................................................ G02B 6/02
(Continued)

(56) References Cited

U.S. PATENT DOCUMENTS 5,953,478 A    9/1999  Sanghera et al.
6,885,784 B2 *  4/2005  Bohnert ............... G01L 11/025
                                                          385/12
(Continued)

FOREIGN PATENT DOCUMENTS

| CN | 102483337 A | 5/2012 |
|---|---|---|
| CN | 102758203 A | 10/2012 |
| JP | 2012021939 A | 2/2012 |

OTHER PUBLICATIONS

"Sham"-Tsong Shiue et al. [Effect of coating thickness on thermal stresses in tungsten-coated optical fibers, J. Appl. Phys., vol. 87, No. 8, 3760 (2000).*
(Continued)

*Primary Examiner* — Kaveh C Kianni
(74) *Attorney, Agent, or Firm* — Banner & Witcoff, Ltd.

(57) ABSTRACT

A fiber optic sensor device comprising an optical fiber with a multilayer coating on the optical fiber at least in a fiber section of the optical fiber. The multilayer coating comprises a chrome layer on the optical fiber, a metal layer such as a copper layer on the chrome layer and an indium or lead layer on the metal layer. The indium or lead layer having a thickness larger than thicknesses of the chrome and metal layers, preferably with a thickness about equal to the radius of the optical fiber.

10 Claims, 3 Drawing Sheets

(51) Int. Cl.
*G01K 11/32* (2006.01)
*G01K 13/00* (2006.01)

(58) Field of Classification Search
USPC .......................................................... 385/123
See application file for complete search history.

(56) References Cited

U.S. PATENT DOCUMENTS

| | | | |
|---|---|---|---|
| 7,003,184 B2* | 2/2006 | Ronnekleiv | A61B 5/01 385/12 |
| 2005/0232313 A1* | 10/2005 | Fermann | H01S 3/06708 372/6 |
| 2006/0285813 A1* | 12/2006 | Ferguson | G01B 11/16 385/138 |
| 2011/0280280 A1* | 11/2011 | Kochergin | G01K 11/32 374/161 |
| 2012/0177319 A1 | 7/2012 | Alemohammad et al. | |

OTHER PUBLICATIONS

Oct. 14-17, 2008—Cheng et al., "Multi-parameter fibre Bragg grating sensor array for thermal vacuum cycling test", International Conference on Space Optics 2008, Toulouse, France.
Jul. 15, 2005—Lupi et al., "Metal coating for enhancing the sensitivity of fibre Bragg grating sensors at cryogenic temperature", Smart Materials and Structures, vol. 14, pp. N71-N76.
2008—Willsch et al, "Fiber Optical Temperature and Strain Measurements for Monitoring and Quench detection of Superconducting Coils", Proc. of SPIE, vol. 7004, 70045G.
Aug. 2010—Feng, Yan et al., "Temperature Sensing of Metal-Coated Fiber Bragg Grating"—IEEE/ASME Transactions on Mechatronics, vol. 15, No. 4.
Sep. 11, 2007—Rajini-Kumar, R. "Performance evaluation of metal-coated fiber Bragg grating sensors for sensing cryogenic temperature" Cryogenics 48 (2008) p. 142-147.
Jan. 13, 2009—Rajinikumar, R. "Design parameter evalunation of a metal recoated Fiber Bragg Grating sensors for measurement of cryogenic temperature or struss in superconducting devices" Cryogenics 49, 2009, p. 202-209.
Jul. 2008—Lupi, Carla et al., "Improving FBG Sensor Sensitivity at Cyogenic Temperature by Metal Coating" IEEE Sensors Journal vol. 8, No. 7.
Jan. 2012—Habisreuther, Tobias et al., "ORMOCER Coated Fiber-Optic Bragg Crating Sensors at Cryogenic Temperatures" IEEE Sensors Journal vol. 12, No. 1.
Mar. 28, 2017—ISR and WO—PCT/NL2016/050832.

* cited by examiner

CRYOGENIC FIBER OPTIC SENSOR DEVICE

CROSS-REFERENCE TO RELATED APPLICATIONS

This application is a U.S. National Stage application under 35 U.S.C. § 371 of International Application PCT/NL2016/050832 (published as WO 2017/091073 A1), filed Nov. 25, 2016 which claims the benefit of priority to Application EP 15196360.0, filed Nov. 25, 2015. Benefit of the filing date of each of prior applications is herby claimed. Each of these prior applications is herby incorporated by reference in its entirety.

FIELD OF THE INVENTION

The invention relates to a fiber optic sensor device such as a fiber Bragg grating (FBG) sensor device that is operable at cryogenic temperatures and to a method of manufacturing a fiber optic sensor.

BACKGROUND

A cryogenic FBG sensor device is described in an article by T. Habisreuther et al., titled "ORMOCER Coated Fiber-Optic Bragg Grating Sensors at Cryogenic Temperatures", IEEE Sensor Journal, Vol. 12, No. 1, pp. 13-16, 2012.

An FBG device comprises an optical fiber wherein a section of the fiber acts as an optical grating, wherein the index of refraction of the fiber varies periodically as a function of position along the axial direction of the fiber. The optical grating causes an optical wavelength dependence of the light reflection in the fiber, typically with a peak at a wavelength that corresponds to the optical period length of the periodic variation. An FBG sensor device makes use of the dependence of the optical period length on an external parameter, such as stress applied to the fiber, or its temperature.

The sensitivity of the optical period length in the optical fiber to external influence decreases with decreasing temperature. This limits the usefulness of FBG sensor devices for temperature measurement at cryogenic temperatures, e.g. for monitoring superconducting magnet systems, space applications, quantum computing/communication etc. Other fiber optic sensor devices, such as devices wherein the fiber is part of an interferometer or an optical frequency domain reflectometer suffer from similar problems.

Habisreuther et al discloses that use of an ORMOCER coating makes it possible to realize a temperature sensitivity of the period length of about 1 pm/K at a temperature of 40 K. However, the sensitivity below 20K is small.

SUMMARY

Among others it is an object to provide a fiber optic sensor device with a higher sensitivity at low cryogenic temperatures.

A fiber optic sensor device comprising an optical fiber, comprising a multilayer coating on the optical fiber at least in a fiber section of the optical fiber, the multilayer coating comprising a bonding layer such as a chrome layer on the optical fiber, a metal layer such as a copper layer on the bonding layer and an indium or lead layer on the metal layer, the indium or lead layer having a thickness larger than thicknesses of the bonding and metal layers.

A fiber section comprising a fiber Bragg grating may be used, which may be a fiber section wherein an index of refraction of the optical fiber varies periodically as a function of position in an axial direction along the optical fiber. Similarly, when the fiber section is part of an interferometer or a reflectometer sensitivity at low cryogenic temperatures is provided.

In an embodiment the indium layer has a thickness of at least a quarter of the radius of the optical fiber per se, and preferably at least half that radius. This ensures that the contraction of the indium with decreasing temperature has a dominant effect on the optical fiber, e.g. on the reflection peak wavelength of the fiber Bragg grating. The copper layer may have a thickness in a range of ten to five hundred nanometer. This may be used to support transmission of strain from the indium layer to the fiber and production of a homogenous thickness of the Indium during the manufacturing procedure. The chrome layer has a thickness in a range of one to ten nanometer.

A method of manufacturing a fiber optic sensor device, the method comprising
- vapor deposition of a chrome layer on an optical fiber that comprises fiber section comprising a fiber Bragg grating,
- vapor deposition of a copper layer on the chrome layer;
- electroplating the copper layer with an indium layer having a thickness larger than thicknesses of the chrome and copper layers. When the optical fiber section comprises a fiber Bragg grating, this method makes it possible to keep the temperature of the optical fiber so low during addition of the coating that reflectivity of the fiber Bragg grating is not significantly affected.

BRIEF DESCRIPTION OF THE DRAWING

These and other objects and advantageous aspects will become apparent from the following description of exemplary embodiments with reference to the following figures

DETAILED DESCRIPTION OF EXEMPLARY EMBODIMENTS

Figure 1:
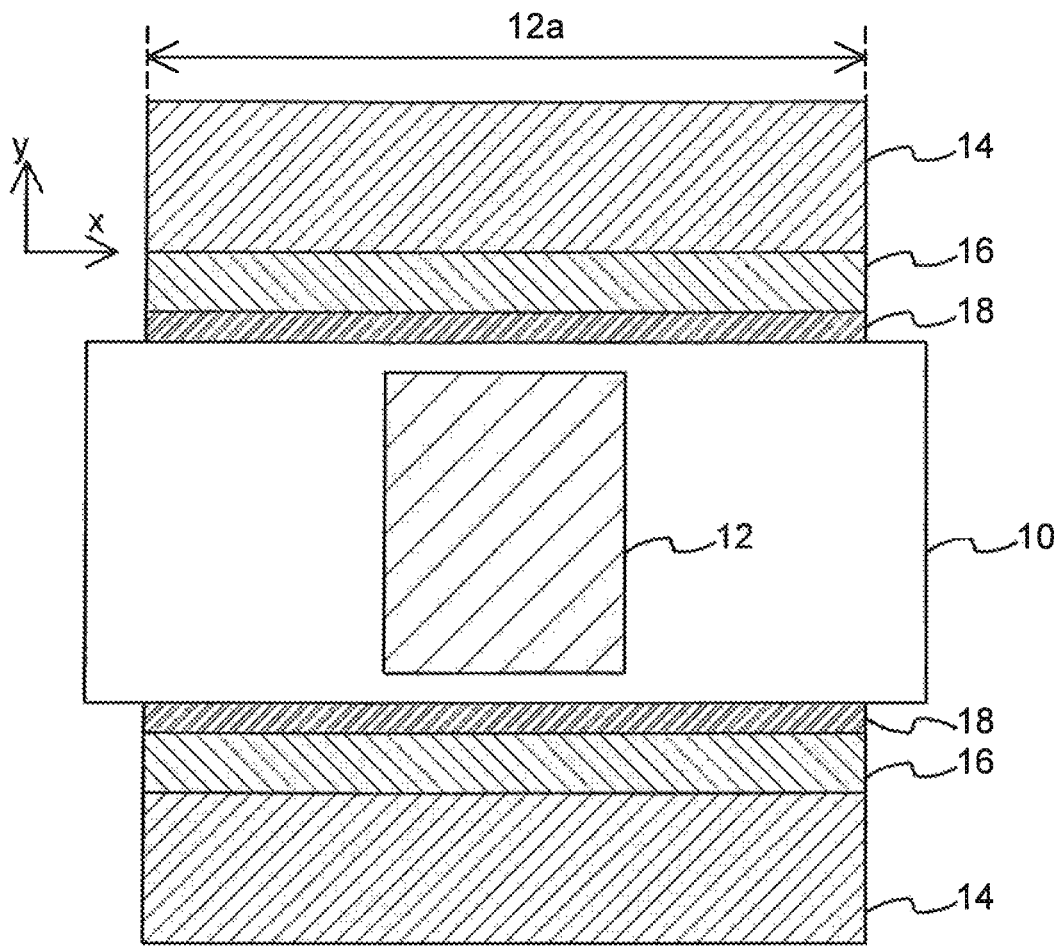
FIG. 1 shows a cross section of a fiber optic sensor device

FIG. 1 shows a cross section (not to scale) of a fiber optic sensor device comprising an optical fiber 10, with a fiber Bragg grating (FBG) 12 in a section 12a of the optical fiber 10. FBG 12 is indicated symbolically by shading. Optical fiber 10 may be a silica fiber or a polymer fiber for example. Preferably, a silica fiber is used as this makes it possible to use longer fibers without significant amplitude loss. A multilayer coating is provided on optical fiber 10 in fiber section 12a. In the illustrated embodiment the multilayer coating comprises chrome layer 18 directly on optical fiber 10, a copper layer 16 directly on chrome layer 18 and an indium layer 14 directly on copper layer. 16. Optical fiber 10 may have any length in its axial direction (the x direction in the figure). Although an embodiment is shown wherein only fiber section 12a of optical fiber 10 is covered by the multilayer coating, it should be appreciated that instead all of optical fiber 10 may be covered in this way.

Figure 2:
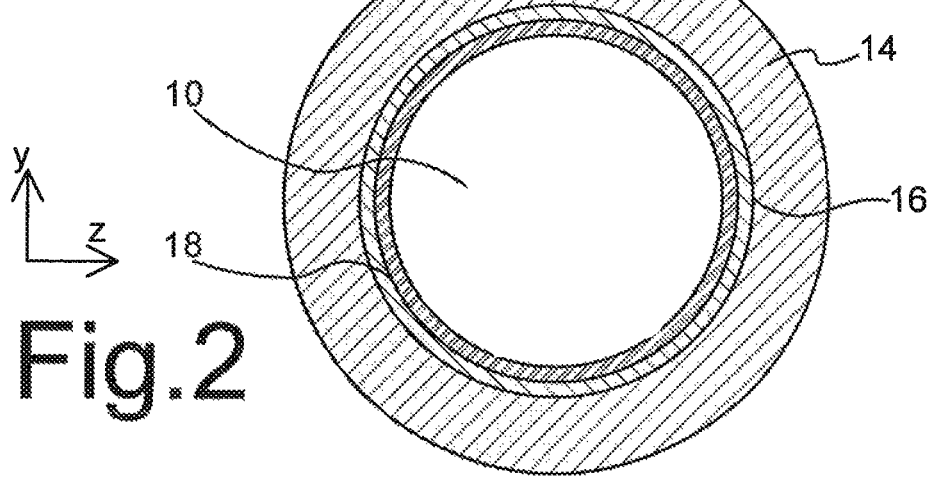
FIG. 2 shows a cross section of a fiber optic sensor device

FIG. 2 shows a cross section (not to scale) of the fiber optic sensor device with a yz-plane perpendicular to the axial direction, within the fiber section where the multilayer coating is present. Optical fiber 10 may have a circular circumference in this cross-section. Multilayer coating may cover the entire circumference of optical fiber 10 as shown in FIG. 2. Indium layer 14 has a thickness larger than thicknesses of chrome layer 18 and copper layer 16. In an embodiment the chrome layer has a thickness in a range of two nanometer to ten nanometer. The copper layer may have a thickness in a range of a hundred nanometer and five hundred nanometer. The indium layer may have a thickness about equal to the radius of optical fiber 10 (i.e. the radius without the multilayer coating), or in a range including said radius, e.g. at least a quarter, and more preferably at least half the radius of optical fiber 10. This ensures that expansion and contraction of the indium layer significantly affect the optical fiber. The need to affect the optical fiber imposes no upper limit of the thickness range, but for reasons of avoiding excessive use of material the thickness range may be limited to no more than four times, and preferably no more than twice the fiber radius.

Thus for example, if the radius of optical fiber 10 is sixty micrometer (diameter hundred and twenty micrometer) the thickness of the indium layer may be sixty micrometer, and if the fiber radius is twenty micrometer the indium layer thickness may be twenty micrometer.

In an embodiment only part of optical fiber 10 is covered by the multilayer coating, for example only over a range of axial positions that includes the position of the fiber Bragg grating. Alternatively, the whole of optical fiber 10 may be covered by the multilayer coating. Preferably, the multilayer coating, covers the optical fiber entirely in the circumferential direction at the axial positions where it is preference. Alternatively, a partial coverage may be used, e.g. in strips extending in parallel in the axial direction.

Optical fibers comprising an FBG are commercially available and methods of manufacturing an optical with an FBG are known per se, e.g. by including doping in the optical material of the fiber with a concentration that varies periodically as a function of position. In one example, the variation of the concentration may be created by exposure to light with a spatially variable optical power distribution. The optical fiber may be of silica, and the doping may be germanium doping.

As is known per se, in an FBG, the index of refraction of the optical fiber varies periodically as a function of position in an axial direction. In FIG. 1 a part of optical fiber wherein such a variation occurs is indicated symbolically by shading. The variation results in a peak or peaks in the optical reflection within the fiber as a function of wavelength at a wavelength or wavelengths at which reflections from different periods of the variation of the index of refraction interfere coherently. Although an example with a single FBG is shown, it should be appreciated that a plurality of FBGs may be present, optionally with different periods of variation of index of refraction, possibly with superimposed patterns of periodic variation.

A fiber optic sensor device as shown in FIGS. 1 and 2 may be manufactured starting from an uncoated optical fiber containing an FBG, by successive deposition of the chrome, copper and indium layers. Preferably, the temperature of the optical fiber is not raised above three hundred degrees centigrade during the deposition, to avoid suppression or reduction of the spatial periodic variation of the index of refraction of the optical fiber that forms the FBG. In a process that meets this temperature requirement, the chrome layer may be deposited in a first step by means of vacuum deposition (e.g. by chemical vapor deposition CVD, or physical vapor deposition PVD). The thickness of the chrome layer may be at least two nanometer, and preferably less than ten nanometer. The copper layer may be deposited by means of vacuum deposition. The indium layer may be deposited by means of an electroplating step, using the copper layer as electrode. The copper layer may have a thickness of at least a hundred nanometer and preferably less than five hundred nanometer. The indium layer may have a thickness of at least ten micrometer and preferably about sixty to a hundred micrometer or even more.

Indium is used to provide the thermal sensitivity down to cryogenic temperatures. The thickness of the indium layer is larger than the thicknesses of the chrome and copper layers. This helps to generate a mechanical force to change the length of the optical fiber and the other functional coatings.

Temperature dependent expansion/contraction of the indium layer generates mechanical strain, which is transmitted to the FBG via the copper and chrome layers. The larger thickness of the indium layer ensures that the thermal expansion/contraction of the indium layer dominates the resulting strain of the FBG. The strain of the FBG results in a wavelength shift of the reflection peak of the FBG. Use of indium has the double advantageous effect that it provides high sensitivity at cryogenic temperature and that deposition is possible without even approaching three hundred degrees centigrade. Instead of indium, lead could be used, which also provides high sensitivity at cryogenic temperature. The copper layer serves to enable electroplating, bonding to the indium layer and strain transmission from the indium layer. Instead of copper other metals may be used to provide sufficient bonding of the indium and ensure a mechanical force transfer between the indium and the optical fiber. For example, silver, gold, platinum or palladium may be used. The chrome layer is an example of a bonding layer that provides for bonding to the copper layer to the optical fiber. Furthermore the chrome layer transmits strain. Instead of chrome may be used. Any other layer that bonds the metal layer such as the copper layer to the optical fiber may be used instead of a chrome layer.

Figure 3:
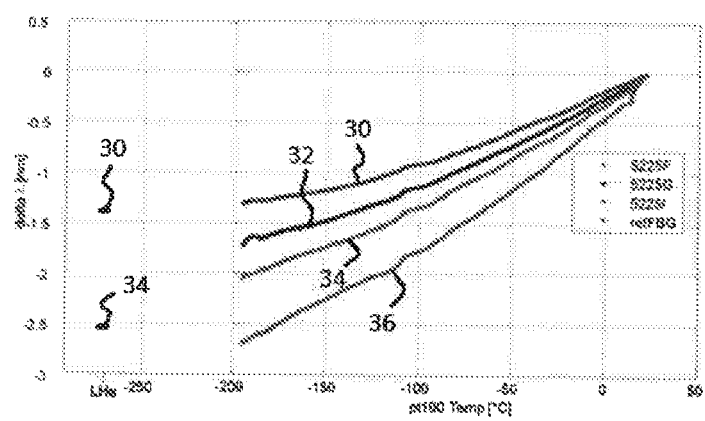
FIG. 3 illustrates sensitivity of a fiber optic sensor device

FIG. 3 illustrates sensitivity of a fiber optic sensor device to temperature. The shift of the measured peak reflection wavelength (plotted vertically) is shown as a function of temperature (plotted horizontally). As will be appreciated, the slope of the temperature dependence corresponds to the sensitivity. Curve 30 is for a reference fiber without coating. As can be seen, this curve levels off with decreasing temperature, which corresponds to reduced sensitivity. Curves 32, 34, 36 are for fiber with indium layers of increasing thickness. Measurements at liquid helium temperature have been indicated corresponding to the curve 30 for the fiber without coating and the curve 34 of the fiber with one of the coating thicknesses. The lowest curve 36 was measured with a coating thickness of eighty micrometer for an optical fiber with a diameter of a hundred and twenty five micrometer and the higher curves 32, 34 are for smaller thicknesses. As can be seen, with decreasing temperature, the slope of the curves with the indium layer is larger than without this layer, which corresponds to maintenance of a higher sensitivity at lower temperature.

Measurements performed down to a temperature of 4K with the multilayer coating indicated a sensitivity of about 1 picometer per Kelvin between 4 and 20K, much larger than for a similar fiber without coating.

The fiber optic sensor device may used as part of a system for measuring the wavelength or wavelength changes of a peak in the reflection from FBG 12. Such a system may comprise a light source (e.g. a broadband or wavelength scannable source) and a wavelength measuring device optically coupled to optical fiber 10 of the fiber optic sensor device. The fiber optic sensor device may be used to measure temperature e.g. in monitoring for space applications, such as liquid hydrogen fuel tanks, or monitoring of superconductive electrical power transmission systems, or monitoring of superconducting magnets system e.g. in MRI systems or nuclear fusion installations.

Figure 4:
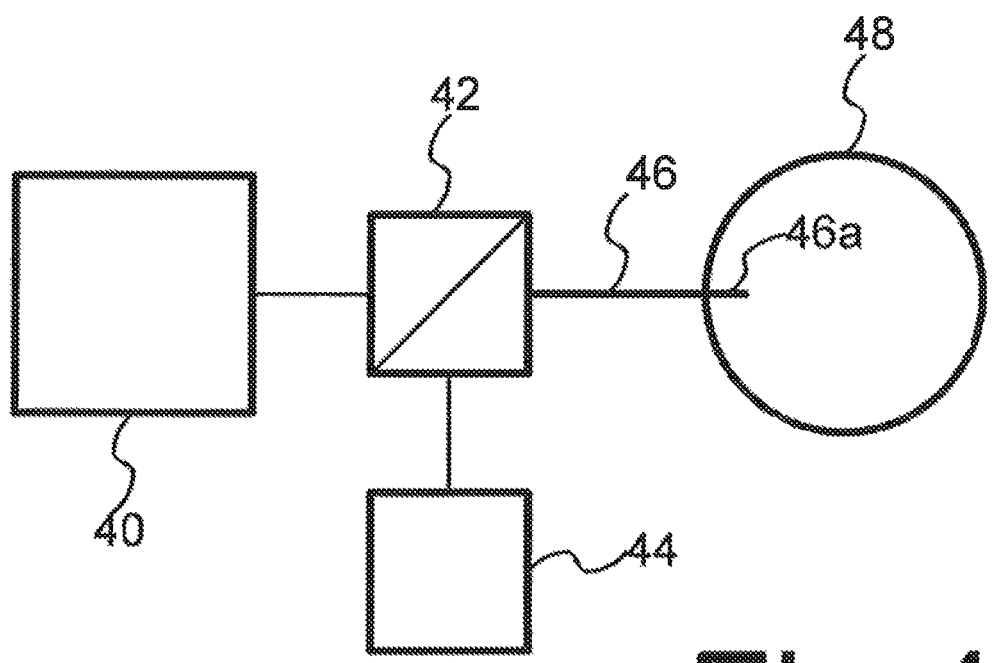
FIG. 4 shows an interrogator system

FIG. 4 shows an interrogation system for measuring an optical length change of the fiber section. The interrogation system comprises a light source 40, an optical coupler 42, a wavelength detector 44 and a fiber optic sensor device 46 as described by reference to FIGS. 1 and 2. By way of example, the interrogation system is shown as part of a cryogenic system that comprises a container 48, of which the interior is cooled to cryogenic temperatures (less than 100K and more preferably less than 25K). A part 46a of fiber optic sensor device 46 that comprises the fiber section with the FBG and the multilayer coating is located inside container 48.

Light source 40, wavelength detector 44 and fiber optic sensor device 46 are optically coupled to optical coupler 42. Optical coupler 42 is configured to transmit light from light source 40 to fiber optic sensor device 46 and to transmit reflected light from fiber optic sensor device 46 to wavelength detector 44. Light source 40 may be a broadband light source. In operation, wavelength detector 44 measures changes of the wavelength of light reflected by the FBG in container 48.

Other types of interrogation system may be used. For example, a wavelength scanned monochromatic light source may be used, in which case wavelength detector 44 may be replaced by a detector that detects the time and/or wavelength during a wavelength scan when the FBG reflects light. As another example, transmission by the FBG rather than reflection may be measured.

Instead of a fiber optic sensor device comprising an optical fiber with a fiber Bragg grating (FBG) other types of fiber optic sensor device may be used. For example a fiber optic sensor device may be based on the optical length of the fiber including the fiber section with the multilayer coating, but without FBG.

In this type of embodiment the interrogator system may include an interferometer that comprises the optical fiber with at least a fiber section having a multilayer coating. Any type of interferometer may be used, such as a Fabry Perot interferometer, or multi-branch interferometer, wherein at least one of the branches contains a optical fiber with at least a fiber section having a multilayer coating. In an embodiment the branches may comprise reflectors. For this purpose the fiber including the fiber section with the multilayer coating may have an input surface and a reflective end surface, the fiber section being located between the input surface and a reflective end surface. Instead of an interferometric interrogator system other optical length measuring systems may be used, such as a optical frequency domain reflectometer. In other embodiments the interrogator system may use other effects such as Rayleigh scattering based technology (OFDR), Brillouin based technology (BOTDR).

The invention claimed is:

1. A cryogenic system for cooling an interior of a container to a cryogenic temperature, the cryogenic system comprising a fiber optic sensor system and the container, the fiber optic sensor system comprising a fiber optic sensor device comprising an optical fiber, comprising
   a multilayer coating on the optical fiber at least in a fiber section of the optical fiber, the multilayer coating comprising a bonding layer on the optical fiber, a metal layer on the bonding layer and an indium or lead layer on the metal layer, the indium or lead layer having a thickness larger than thicknesses of the bonding and metal layers,
   wherein the fiber optic sensor system comprises an interrogation system configured to measure an optical length change of the fiber section, and
   wherein the fiber section is located in the interior of the container.

2. The cryogenic system of claim 1, wherein the indium or lead layer has a thickness of at least a quarter and more preferably half the radius of the optical fiber.

3. The cryogenic system of claim 1, wherein the metal layer is a copper layer, silver layer, gold layer, platinum layer or palladium layer.

4. The cryogenic system of claim 3, wherein the metal layer has a thickness in a range of ten to five hundred nanometer.

5. The cryogenic system of claim 1, wherein the bonding layer is a chrome layer.

6. The cryogenic system of claim 5, wherein the chrome layer has a thickness in a range of one to ten nanometer.

7. The cryogenic system of claim 1, wherein the fiber section comprises a fiber Bragg grating.

8. The cryogenic system of claim 1, comprising an interferometer, wherein the fiber section is part of the interferometer.

9. The cryogenic system of claim 1, wherein the optical fiber is a silica fiber.

10. A method for operating the cryogenic system of claim 1, the method comprising using the fiber optic sensor system to measure the cryogenic temperature in the interior of the container.

* * * * *